3,336,400
DIHALOPHENOL SEPARATION

Kenneth B. Bradley, Midland, Mich., assignor to The Dow Chemical Company, Midland, Mich., a corporation of Delaware
No Drawing. Filed Feb. 21, 1964, Ser. No. 346,410
3 Claims. (Cl. 260—623)

This invention relates to a new process for separating a purified dihalophenol isomer from an isomeric mixture of dihalophenols. It relates more particularly to a method for separating a purified 2,6-dihalophenol from its mixture with the isomeric 2,4-dihalophenol. The dihalophenols included are those wherein at least one halogen atom is chlorine and the other is chlorine or bromine. The 2,6-dihalophenols, therefore, are those which have the structure

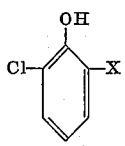

wherein X is chlorine or bromine and the 2,4-dihalophenols have one of the structures

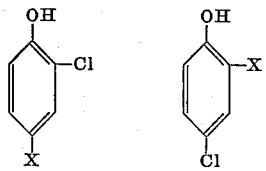

Mixtures of such 2,6 and 2,4-dihalophenols are commonly encountered as the dihalophenol product of preparations designed to make the 2,6-isomer. For example, when one attempts to make 2,6-dichlorophenol by chlorinating o-chlorophenol in a non-polar solvent medium, the phenolic product obtained is a mixture containing about 70–75 percent 2,6-dichlorophenol, about 25 percent 2,4-dichlorophenol, and small quantities of trichlorophenols and unreacted o-chlorophenol. The separation of pure 2,6-dichlorophenol from such a mixture by conventional methods is a difficult and tedious procedure. Effective separation of these isomers by distillation is usually not practical because of their close boiling points. Separation by fractional crystallization is also impractical because of the similar properties of these compounds.

It has now been found that a 2,6-dihalophenol such as described above is easily separated in purified form from its mixture with the isomeric 2,4-dihalophenol by heating the mixture sufficiently to convert it to a homogeneous liquid, mixing the homogeneous liquid mixture with water, cooling the water-dihalophenol mixture below about 40° C., thereby causing crystallization of pure 2,6-dihalophenol from the phenolic layer, and separating the crystals from the aqueous mixture. By this method, crystals of the 2,6-dihalophenol of better than 98 percent purity are obtained directly in yields of 75–85 percent of the total 2,6-dihalophenol present.

The method is applicable to dihalophenol mixtures containing at least about 40 percent by weight of the 2,6-dihalophenol with the remainder consisting essentially of the isomeric 2,4-dihalophenol, i.e., with less than about 10 percent of other phenolic bodies, traces of solvent, and the like. Best results are obtained when the dihalophenol mixture contains at least about 60 percent of the 2,6-isomer. The process can be used to obtain highly purified 2,6-dihalophenol from mixtures containing as much as 97 percent by weight of the desired compound. The recovery of purified 2,6-dihalophenol is more efficient as the concentration of 2,6-isomer in the starting material increases. The separation process is operated by heating the dihalophenol mixture where necessary to obtain it as a homogeneous liquid, adding to the liquid mixture about 3 to about 100 parts of water by weight per 10 parts of dihalophenol mixture, and cooling the water-dihalophenol mixture below about 40° C. while maintaining the aqueous and phenolic layers in intimate contact during the cooling process by suitable agitation. Crystals of pure 2,6-dihalophenol separate during the cooling step and crystallization from the cooled slurry is ordinarily complete in 0.1–2 hours.

Preferably, the aqueous slurry is cooled to a temperature of about 0° C. to about 30° C. Slightly higher yields of 2,6-dihalophenol are obtained at the lower temperatures, for example, at about 0–15° C.

The crystalline 2,6-dichlorophenol can be separated from the aqueous mixture by any conventional means such as filtration or decantation. The liquid portion of the aqueous mixture consists of a liquid dihalophenol layer and an aqueous layer which contains only traces of phenols. The aqueous layer is advantageously used to wash the separated 2,6-dihalophenol crystals.

Example 1

A quantity of 152.5 g. of a dichlorophenol fraction containing 70 percent by weight of 2,6-dichlorophenol and the remainder consisting essentially of 2,4-dichlorophenol was heated to form a homogeneous liquid. To this liquid there was added 70 g. of water, the mixture was thoroughly stirred, and it was cooled while stirring to 20° C. The aqueous slurry of white crystals thereby formed was held at about 20° C. for 30 minutes and then filtered. The filtrate separated into a lower organic layer and an upper water layer which was drawn off and used to wash the filter cake. The filter cake was dried to obtain 78.2 g. of white crystalline 2,6-dichlorophenol of 98.6 percent purity. The organic layer in the filtrate amounted to 73.5 g. and contained 56 percent by weight of 2,4-dichlorophenol and 39 percent of 2,6-dichlorophenol, the remainder being water. The recovered aqueous layer contained only trace amounts of phenols.

Example 2

Another 152.5 g. sample of a 70 percent 2,6-dichlorophenol-30 percent 2,4-dichlorophenol mixture was melted and then stirred with 70 g. of water as in Example 1 except that the aqueous mixture was cooled to 10° C. for 30 minutes. Upon working up the aqueous slurry as described in Example 1, 83.7 g. of white crystalline 2,6-dichlorophenol of 99.0 percent purity was obtained. The organic layer in the filtrate amounted to 63.5 g. and contained 61 percent by weight of 2,4-dichlorophenol and 32 percent of 2,6-dichlorophenol, the remainder being water.

Example 3

A 150 g. sample of a 74 percent 2,6-dichlorophenol-26 percent 2,4-dichlorophenol mixture was stirred with 100 g. of water at 50° C. and the slurry was cooled slowly while stirring to 0° C. Crystals began to separate at about 30–35° C. After 30 minutes at 0° C., the crystals were separated on a filter, washed with cold water, and dried. There was obtained 97 g. of white, crystalline 2,6-dichlorophenol of 99 percent purity.

Example 4 illustrates a cyclic type of operation with high recovery of 2,6-dichlorophenol combined with recovery of 2,4-dichlorophenol adaptable to large scale operation of the process.

Example 4

A chlorinated o-chlorophenol product contained 70 percent by weight of 2,6-dichlorophenol, 29.1 percent 2,4-dichlorophenol, and 0.9 percent o-chlorophenol. A series of experiments was run wherein 500 g. portions of this mixture were stirred with 300 g. portions of water at about 60° C., the resulting slurries were cooled slowly while stirring to 10° C., and the crystals of pure 2,6-dichlorophenol which formed were separated on a filter. These crystalline products were combined and stored as were the oil layers from the filtrates. The aqueous layer from each filtrate was used to make up the water portion for the next experiment. After seven such cycles, the combined oil layers from the filtrates were fractionally distilled to separate a fraction consisting of 2,4-dichlorophenol of better than 95 percent purity and a mixed fraction of 60.1 percent 2,6-dichlorophenol and 39.9 percent 2,4-dichlorophenol. This latter fraction, in two approximately equal portions, was mixed with water at 60° C. and cooled as described above to separate additional pure 2,6-dichlorophenol. The combined 2,6-dichlorophenol products from all of the above cycles amounted to 2088 g. of 99 percent purity, a total recovery of about 84 percent of the 2,6-dichlorophenol present in the original starting material.

*Example 5*

To 300 g. of water at 40° C. there was added with sitrring 300 g. of a mixture of 75 percent 2-bromo-6-chlorophenol and 25 percent 4-bromo-2-chlorophenol. The resulting mixture was cooled slowly with stirring and was seeded with crystals of pure 2-bromo-6-chlorophenol as it cooled. Crystals began to separate at 34° C. Cooling was continued until the temperature of the mixture reached 10° C. The white crystals were separated by filtration, washed with cold water, and dried. There was obtained 157.5 g. of 2-bromo-6-chlorophenol, freezing point 52.7° C., purity by infrared analysis 98 percent. From the filtrate and water washes there was obtained 108.1 g. of an oil containing 49 percent 2-bromo-6-chlorophenol and 51 percent 4-bromo-2-chlorophenol.

Results comparable to those shown in Example 5 are obtained when a similar mixture of 2-bromo-6-chlorophenol and 2-bromo-4-chlorophenol is stirred with water and cooled to cause crystallization as described above.

I claim:
1. A method for separating a 2,6-dihalophenol of the formula

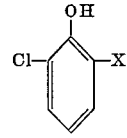

wherein X is selected from the group consisting of chlorine and bromine from a homogeneous liquid dihalophenol mixture containing at least about 40 percent by weight of said 2,6-dihalophenol, the remainder of the mixture consisting essentially of the isomeric 2,4-dihalophenol, which method comprises mixing said mixture with about 3 to about 100 parts by weight of water per 10 parts of mixture, cooling the water-dihalophenol mixture to about 0° C. to about 40° C. while maintaining the water and the dihalophenol in intimate contact, and separating solid 2,6-dihalophenol from the aqueous slurry thereby produced.

2. The method of claim 1 wherein X is chlorine.
3. The method of claim 1 wherein X is bromine.

References Cited

UNITED STATES PATENTS 2,708,209  5/1955  Nicolaisen et al. _____ 260—623

LEON ZITVER, *Primary Examiner.*

W. B. LONE, *Assistant Examiner.*